UNITED STATES PATENT OFFICE.

HEINRICH THRON, OF FRANKFORT-ON-THE-MAIN, GERMANY, ASSIGNOR TO VEREINIGTE CHININFABRIKEN ZIMMER & CO., G. M. B. H., OF FRANKFORT-ON-THE-MAIN, GERMANY.

MANUFACTURE OF HYDROCINCHONA ALKALOIDS.

989,664.  Specification of Letters Patent.  Patented Apr. 18, 1911.

No Drawing.   Application filed January 13, 1911.   Serial No. 602,515.

*To all whom it may concern:*

Be it known that I, HEINRICH THRON, a subject of the German Emperor, and resident of Frankfort-on-the-Main, Germany, have invented certain new and useful Improvements in the Manufacture of Hydrocinchona Alkaloids, of which the following is a specification.

In the cinchona, or Peruvian bark, there occur, with the cinchona alkaloids, smaller quantities of so-called hydro-cinchona-alkaloids which differ from the first-named alkaloids in that they contain two more atoms of hydrogen. The preparation of the hydro-alkaloids has hitherto only been accomplished by very troublesome separation methods, and a synthetic method of manufacture has hitherto been unknown. I have found that these hydro-cinchona-alkaloids can be obtained in a simple manner, if the cinchona alkaloids be treated with hydrogen in the presence of a colloidal solution of a metal of the platinum group.

The following example illustrates the manner in which this invention may be carried out, but the invention is not limited to this precise example. The parts are by weight.

A solution of 2 parts of palladium dichlorid and 2 parts of gum arabic in 100 parts of water is treated with hydrogen, until the liquor assumes a deep black color. Then a solution of 50 parts of quinin hydrochlorid in 500 parts of water acidified with 10 parts of 10 per cent. hydrochloric acid is added and the liquid further agitated with hydrogen, preferably under slight pressure, until the quantity corresponding to theory, namely, 0.252 parts, have been absorbed. Then ammonia in excess is added and the precipitated base is agitated with ether. On concentrating the ethereal solution the hydroquinin, having the well-known properties, crystallizes out.

The hydro-quinidin, hydro-cinchonin, and hydro-cinchonidin, can be obtained in a similar manner.

I claim:—

The manufacture of hydro-cinchona-alkaloids by treating a cinchona alkaloid with hydrogen in the presence of a colloidal solution of a metal of the platinum group.

In testimony whereof I have signed my name to this specification in the presence of two subscribing witnesses.

HEINRICH THRON.

Witnesses:
 JEAN GRUND,
 CARL GRUND.